July 16, 1968     L. W. NIEDRACH     3,393,100
PROCESS OF GENERATING ELECTRICAL ENERGY UTILIZING
A FUEL CONTAINING CARBON MONOXIDE AND A FUEL CELL
ELECTRODE STRUCTURE THEREFOR, COMPRISING A
CARBON-MONOXIDE RESISTANT ELECTRODE BODY Filed Oct. 1, 1965     2 Sheets-Sheet 1

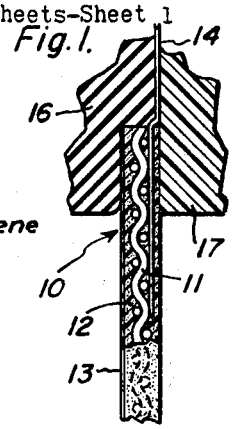

Fig. 1.

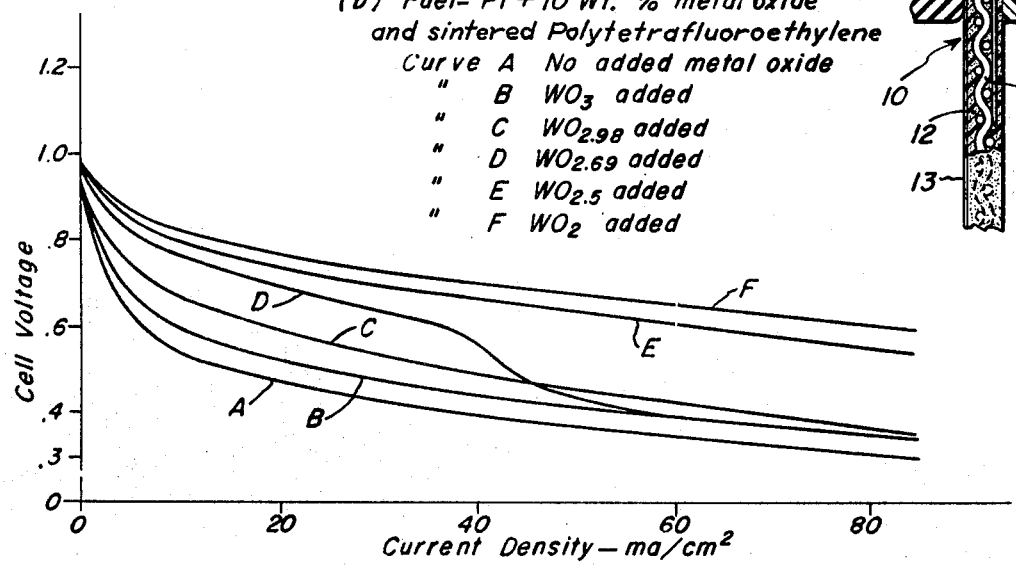

Fig. 2.

Electrolyte: 5N $H_2SO_4$ at 25 °C
Electrodes: (a) Oxygen- Pt bonded with Polytetrafluoroethylene
(b) Fuel- Pt + 10 Wt. % metal oxide and sintered Polytetrafluoroethylene Curve A   No added metal oxide
"   B   $WO_3$ added
"   C   $WO_{2.98}$ added
"   D   $WO_{2.69}$ added
"   E   $WO_{2.5}$ added
"   F   $WO_2$ added

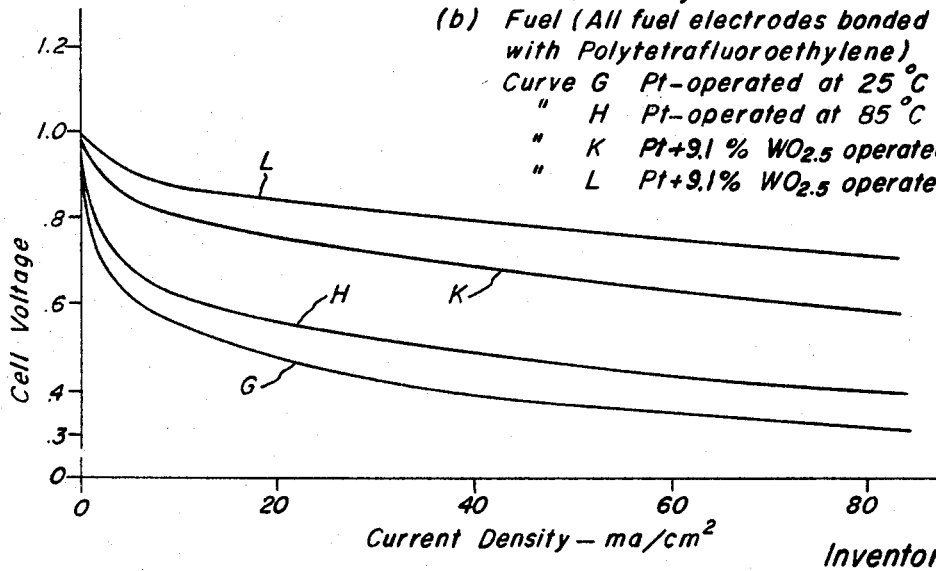

Fig. 3.

Electrolyte: 5N $H_2SO_4$
Electrodes: (a) Oxygen-Pt bonded with Polytetrafluoroethylene
(b) Fuel (All fuel electrodes bonded with Polytetrafluoroethylene)

Curve G   Pt-operated at 25 °C
"   H   Pt-operated at 85 °C
"   K   Pt+9.1 % $WO_{2.5}$ operated at 25 °C
"   L   Pt+9.1% $WO_{2.5}$ operated at 85 °C Inventor:
Leonard W. Niedrach,
by
His Attorney

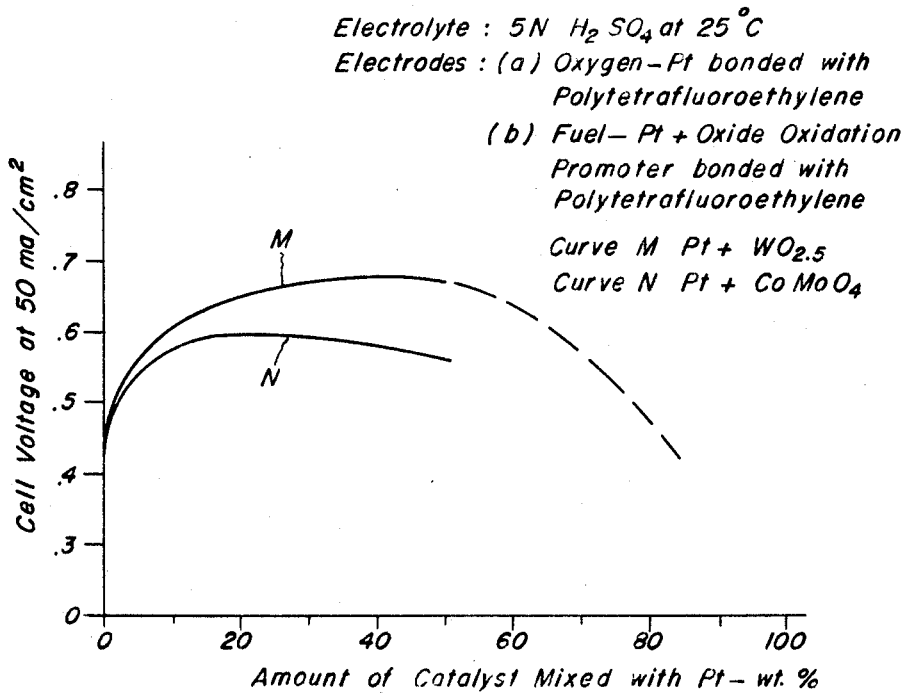

Fig. 4.

Electrolyte: 5N H$_2$SO$_4$ at 25 °C
Electrodes: (a) Oxygen–Pt bonded with Polytetrafluoroethylene
(b) Fuel– Pt + Oxide Oxidation Promoter bonded with Polytetrafluoroethylene Curve M   Pt + WO$_{2.5}$
Curve N   Pt + CoMoO$_4$

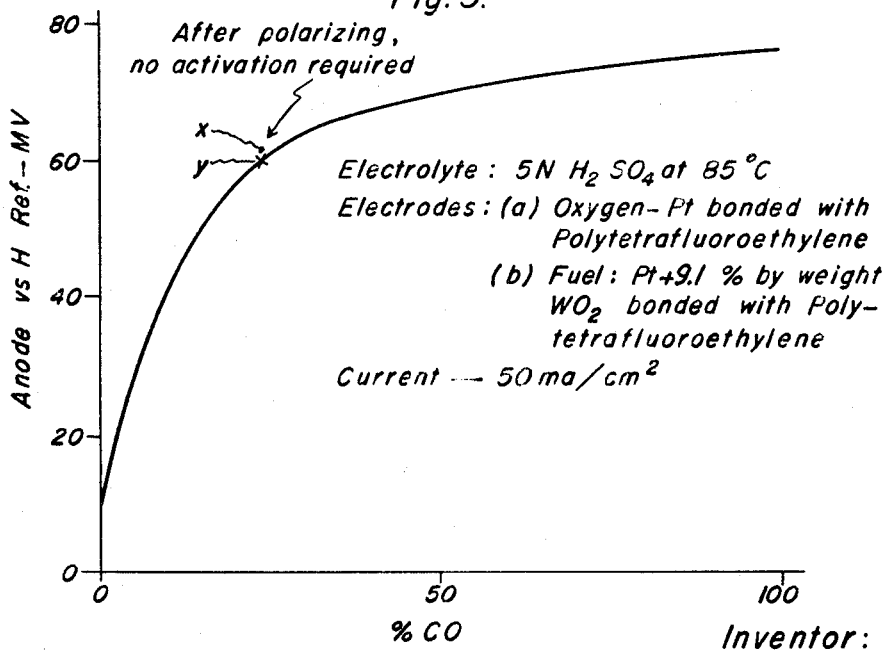

Fig. 5.

Electrolyte: 5N H$_2$SO$_4$ at 85 °C
Electrodes: (a) Oxygen–Pt bonded with Polytetrafluoroethylene
(b) Fuel: Pt+9.1 % by weight WO$_2$ bonded with Polytetrafluoroethylene
Current — 50 ma/cm$^2$ Inventor:
Leonard W. Niedrach,
by
His Attorney.

United States Patent Office 3,393,100
Patented July 16, 1968

3,393,100
PROCESS OF GENERATING ELECTRICAL ENERGY UTILIZING A FUEL CONTAINING CARBON MONOXIDE AND A FUEL CELL ELECTRODE STRUCTURE THEREFOR, COMPRISING A CARBON-MONOXIDE RESISTANT ELECTRODE BODY
Leonard W. Niedrach, Schenectady, N.Y., assignor to General Electric Company, a corporation of New York
Filed Oct. 1, 1965, Ser. No. 492,201
7 Claims. (Cl. 136—120)

This invention relates to means for preventing or retarding the carbon monoxide poisoning of platinum and platinum-containing catalysts in the fuel electrodes of fuel cells. More particularly, this invention is directed to the use of a mixture comprising platinum and an anti-poisoning agent, or adjuvant material, selected from the group consisting of the oxides of tungsten and molybdenum to form the catalytically active body of a porous fuel electrode structure.

The basic construction of fuel cells is rather simple in principle. Essentially such units consist of two electrodes separated by an electrolyte. A fuel, such as hydrogen, is supplied to the anode (fuel electrode) where it reacts and releases electrons. These electrons flow through an external circuit connection to the cathode (oxygen electrode) and there are consumed by an oxidizing material, such as oxygen gas. The electrical circuit is completed through the fuel cell by ionic conduction through the electrolyte.

Fuels for fuel cells encompass non-hydrocarbon fuels, hydrocarbon fuels, reformed fuels, and certain specialty fuels. One way of rendering hydrocarbons more reactive or effective in fuel cells is by submitting the hydrocarbons to a preliminary reaction in which these hydrocarbons are converted to more reactive materials. As an example, by reacting hydrocarbons with steam they can be converted to hydrogen and carbon dioxide plus smaller amounts of carbon monoxide, methane and related impurities. Such reactions are generally called "reforming" reactions and the gaseous mixture so obtained is generally called "reformed fuel." The hydrogen in this mixture may serve as the fuel in the usual hydrogen fuel cell to which the mixture is applied. A similar procedure can be employed wherein alcohol is the substance reformed. In each instance, carbon monoxide is generated and concentrations as high as about 10% by volume are often encountered in the mixture of such gaseous products of fuel reformation to be supplied to the fuel electrode.

As is well recognized from heterogenous catalysis, carbon monoxide is a "poison" to platinum or platinum-containing catalysts, because of the very great affinity of carbon monoxide for the surface of the catalyst material. This poisoning agent occupies active catalytic sites and stubbornly refuses to be removed, whereby the availability of these catalytic sites for further desired catalytic action is precluded. The mechanism by which the specific oxides disclosed herein are able to reduce poisoning of the catalyst is not completely understood; however, the behavior of these materials in combination with platinum in the manner claimed has been observed and their effectiveness in this regard has been clearly established.

The primary benefit in the discovery of the adjuvant behavior of these particular metal oxides in combination with platinum as the catalyst mix lies in the fact that the effective utilization of reformed fuel (hydrogen containing carbon monoxide as an impurity) is thereby rendered commercially feasible at low temperatures (i.e., below about 200° C.).

Another benefit of the discovery of this phenomenon lies in the capacity of such a metal oxide-catalyst mix to permit utilization of gases containing large concentrations of carbon monoxide or of carbon monoxide by itself as a fuel. In the case of the capacity of the mixture of metal oxide and catalyst to survive the poisoning tendency of carbon monoxide, when substantially pure carbon monoxide is used as fuel for the cell, it is known that this mixture effectively promotes the oxidation of the carbon monoxide. In the case of small concentrations of carbon monoxide encountered as an impurity in reformed fuels, however, the exact mechanism has been too difficult to accurately assess.

It is, therefore, a primary object of this invention to provide in connection with a platinum or platinum-containing catalyst in the fuel electrode of a fuel cell a concentration of a material able to prevent or retard poisoning of the noble metal catalyst by concentrations of carbon monoxide gas in the fuel brought into contact with the fuel electrode at temperatures below about 200° C.

It is another object of this invention to provide a method of operation of a fuel cell employing a carbon monoxide-containing fuel including the step of activating the fuel electrode thereof, which comprises platinum or a platinum-containing catalyst acting in combination with an anti-poisoning agent to inhibit carbon monoxide poisoning of the catalyst.

It is a further object of this invention to provide as anti-poisoning agents for platinum in a fuel cell electrode certain metal oxides not subject to attack by strong acid electrolytes.

It is yet another object of this invention to provide specific oxide materials as adjuvant catalysts to aid in the protection of platinum and platinum-containing catalyst materials against carbon monoxide poisoning, which oxide materials in addition to remaining inert toward acidic electrolytes are good electrical conductors and perform effectively at operating cell temperatures ranging from ambient to elevated temperatures.

The aforementioned aspects of this invention are particularly important commercially because of several facts; (a) platinum has been recognized as being the most effective of all the noble metal catalysts, (b) the removal of carbon monoxide from reformed fuels, if required would pose a severe economic penalty, and (c) acid electrolytes are generally more desirable than basic electrolytes.

The particular electrode construction employed in a fuel cell in the practice of this invention is of no consequence. However, the surface area of catalyst should preferably be in excess of 1 square meter per gram.

The above objects are, therefore, attained by employing a fuel electrode provided with platinum as a catalyst having dispersed therethrough a concentration of metal oxide (or oxides) said metal oxide being chosen from the group consisting of oxides of molybdenum and oxides of tungsten. In addition, a method of pretreatment of a fuel electrode so prepared with hydrogen has been discovered, which is essential to activating such fuel electrodes to assure good performance thereof, when high concentrations of CO are encountered.

It is contemplated that in addition to using various oxides of molybdenum and/or tungsten, per se, that double compounds composed of any of these oxides with oxides of other metals, for example, with oxides of cobalt, nickel, vanadium, chromium, etc. in the form of molybdates and tungstates may be used. Oxide mixtures of molybdenum and tungsten also may be used. Cobalt molybdate is one such double compound successfully employed. During the use in a fuel cell of fuel electrodes embodying cobalt molybdate, it has been observed that cobalt leaches out leaving an oxide form of molybdenum in the electrode. Such leaching did not appear to be detrimental.

The exact nature of this invention as well as other objects and advantages thereof will be readily apparent from consideration of the following specification and the annexed drawings in which:

FIG. 1 shows an enlarged cross-sectional view of one fuel electrode construction, which may embody this invention;

FIG. 2 graphically displays polarization curves obtained using carbon monoxide at room temperature as the fuel supplied to a variety of platinum catalyst-tungsten oxide mixtures;

FIG. 3 is a graphic representation of the effect of temperature on the performance of $WO_{2.5}$—Pt fuel electrodes operating with carbon monoxide as the fuel;

FIG. 4 graphically illustrates the effect of electrode composition (catalyst plus metal oxide) on the performance of a fuel cell electrode using carbon monoxide as fuel; and FIG. 5 graphically displays the effect of $H_2$—CO ratio on anode (fuel electrode) polarization.

As has been earlier mentioned hereinabove, the particular electrode construction or arrangement employed forms no part of this invention. A preferred construction within which this invention may be employed is the construction shown in FIG. 1, more fully disclosed and claimed in patent application S.N. 232,689, Niedrach and Alford, filed Oct. 24, 1962, and assigned to the same assignee as the instant invention. A catalyst composition of finely divided metal oxide and catalyst metal powder is mixed with polytetrafluoroethylene (PTFE) binder in this construction to obtain as uniform a dispersion as possible of the catalyst and metal oxide in the resin. The terminal grid 11 is incorporated in the main body 12 of the PTFE-metal oxide-catalyst metal mix. A film 13, which is hydrophobic in nature (e.g. PTFE film), is employed on one side of the electrode 10 for those fuel cell constructions in which the electrolyte to be employed is a free-flowing liquid, which liquid would tend to penetrate the pores of the electrode 10. The electrode structure is heated to sinter the PTFE binder either before or after deposition of film 13 to convert the electrode into a coherent, integral mass. By providing the film 13 on the gas side of the electrode, flow of the electrolyte through electrode 10 into the fuel chamber (not designated) is prevented, yet this film 13 still permits diffusion of the fluid fuel (gas or liquid) or oxidant gas into the body of electrode 10 to form a three-phase interface, where the fuel cell reaction occurs. Conveniently, lead 14 which is electrically connected to the terminal grid 11 is led to the outside of the fuel electrode along the interface between gasket 16 and spacer 17. In those constructions in which the electrolyte is sorbed in a matrix, there is no need for film 13 on the electrode surface.

Although PTFE is the binder used in the particular construction described, other binders may be employed, both organic and inorganic. Thus carbon deposited in situ by decomposition and sintered nickel powder are two examples of other binder materials. The range of binder employed may vary from about 5% or less to about 50% or more of the weight of the total mixture comprising the main body 12. Actually the minimum amount of binder that may be used is the amount required to hold the electrode composition together as a coherent mass and maximum amount is that amount that will deleteriously dilute the catalyst.

One general method for preparing the electrode 10 is as follows: An aqueous suspension containing 59.6% by weight PTFE is diluted with 7 volumes of water. A rigid aluminum foil is used as the casting surface on which is scribed the ultimately desired pattern of the electrodes. The aluminum foil is placed on a hot plate maintained at 120–150° C. to facilitate evaporation of the water as the PTFE emulsion is sprayed onto it, using an air brush. The desired amount of spray per unit area is evenly distributed over the surface at a rate such that wet areas do not accumulate and run. After the desired amount of emulsion has been sprayed onto the casting surface, it is heated at 350° C. to volatilize the emulsifying agent and to sinter the PTFE particles into a coherent film. A mixture of the metal oxide-catalyst metal powder and PTFE emulsion is then prepared and diluted with sufficient water to give a thin slurry, which can be conveniently spread over the PTFE film on the casting surface to cover the scribed area showing the pattern of the desired electrode. When a uniform coating is achieved, the water is slowly evaporated from the emulsion on a hot plate whose bed temperature is slowly increased to a final value of 250–350° C. to dispel the emulsifying agent. To incorporate the current electrode grid 11 in the electrode, a similar procedure is used to form a second PTFE-metal oxide-catalyst metal powder mix directly on another casting surface without an underlying PTFE film. The terminal grid, cut to the desired shape, is centered over the electrode pattern on one of the two casting surfaces and the other casting surface is then centered on top of terminal grid 11. This assembly is placed between two press platens and molded at 350° C. for 2 minutes at pressures which range between 180 and 3000 lbs./sq. inch of electrode surface. Following pressing, the aluminum foil casting surfaces are dissolved from the electrodes in 20% aqueous sodium hydroxide and the electrode structures are rinsed with water and dried. By this technique, electrodes are produced in which the terminal grid is sintered in the PTFE-metal oxide-catalyst metal mix and the electrode is coated on one side with the pure film 13 of PTFE, to be placed facing the gaseous fuel in the cell.

A convenient way of preparing the material comprising the main body 12 of electrode 10 is by taking the aqueous emulsion of PTFE resin and mixing it with from 2 to 20 grams of a mixture of the metal oxide and catalyst metal powder per gram of resin in the emulsion.

In preparing the mixture of catalyst metal and antipoisoning agent amounts of metal oxide may be used extending even higher than 50 weight percent of this mixture as is indicated in FIG. 4. The oxide should preferably be selected from the group comprising $WO_{2.50}$, $WO_{2.00}$ (the lower oxides of tungsten) and $MoO_2$ and comparable lower oxides of molybdenum. Less effective for resistance to poisoning has been obtained using $WO_{3.00}$, $WO_{2.98}$ and $WO_{2.69}$.

In the case of $WO_{2.50}$ the best results were obtained with an oxide-catalyst mixture wherein 50% of the weight thereof was the oxide. Preferably the amount of the oxide additive employed should be in excess of about 5 weight percent and less than about 70 weight percent of the oxide-catalyst mixture.

Performance data obtained for a variety of oxide-catalyst mixes are summarized in Table I. As indicated thereon the tests recorded in Table I were conducted with liquid electrolytes composed, on the one hand, of 5 N sulfuric acid and, on the other hand, of 85 percent phosphoric acid. While data are included for tungsten metal additions it is clear from the known chemistry of tungsten that the surface would quickly become oxidized.

The oxygen electrode (cathode) in each case was a sintered PTFE platinum electrode structure having a platinum loading of 34 mg./cm.$^2$. The fuel electrode (anode) in each instance consisted of metal oxide, catalyst metal and sintered binder (PTFE). Also, in each instance the hydrophobic film 13 consisted of 1.6 mg. of PTFE/cm.$^2$.

TABLE I

| Electrode No. | Added Catalyst | Electrode Composition (mg./cm.²) | | | Oxide in Oxide-Catalyst Mixture (wt. percent) | PTFE Binder (wt. percent) | Cell Voltage (with IR drop) at 50 ma./cm.² | | | | | |
|---|---|---|---|---|---|---|---|---|---|---|---|---|
| | | | | | | | 5N H₂SO₄ Electrolyte | | | | 85= H₃PO₄ Electrolyte, 150° | |
| | | Pt | Oxide | PTFE | | | 25° | | 85° | | | |
| | | | | | | | H₂ | CO | H₂ | CO | H₂ | CO |
| 1 | Pt black only | 34 | | 3.0 | | 8.3 | 0.83 | 0.38 | 0.86 | 0.42–0.48 | 0.84 | 0.21 |
| 2 | CoMoO₄ | 34 | 3.4 | 3.0 | 9.1 | 7.6 | 0.84 | 0.60 | 0.86 | 0.71 | 0.85 | 0.20 |
| 3 | CoMoO₄ | 34 | 3.4 | 3.0 | 9.1 | 7.6 | 0.81 | 0.58 | 0.85 | 0.76 | | |
| 4 | CoMoO₄ | 34 | 3.4 | 3.0 | 9.1 | 7.6 | 0.82 | 0.60 | | | | |
| 5 | CoMoO₄ | 31 | 6.2 | 3.0 | 17 | 7.6 | 0.81 | 0.61 | | | | |
| 6 | CoMoO₄ | 19.5 | 18.5 | 3.0 | 50 | 7.6 | 0.80 | 0.56 | | | | |
| 7 | CoMoO₄ | 28 | 28 | 4.0 | 50 | 6.6 | 0.80 | 0.57 | | | | |
| 8 | WO₃.₉₉ | 34 | 3.4 | 3.0 | 9.1 | 7.6 | 0.85 | 0.42 | 0.87 | 0.48 | | |
| 9 | WO₂.₉₈ | 34 | 3.4 | 3.0 | 9.1 | 7.6 | 0.82 | 0.46 | 0.86 | | | |
| 10 | WO₂.₈₉ | 34 | 3.4 | 3.0 | 9.1 | 7.6 | 0.84 | (ᵃ 0.57) | | | | |
| 11 | WO₂.₅₉ | 34 | 3.4 | 3.0 | 9.1 | 7.6 | 0.82 | 0.64 | 0.85 | 0.78 | | |
| 12 | WO₂.₅₉ | 34 | 3.4 | 3.0 | 9.1 | 7.6 | 0.85 | 0.61 | | | | |
| 13 | WO₂.₅₀ | 20 | 8.4 | 3.0 | 30 | 9.8 | 0.80 | 0.66 | | | | |
| 14 | WO₂.₅₀ | 28 | 28 | 3.0 | 50 | 5.1 | 0.84 | 0.69 | | | | |
| 15 | WO₂.₅₀ | 28 | 28 | 3.0 | 50 | 5.1 | 0.81 | 0.65 | 0.85 | 0.79 | 0.81 | 0.68 |
| 16 | WO₂.₅₀ | 28 | 28 | 3.0 | 50 | 5.1 | 0.85 | 0.68 | | | | |
| 17 | WO₂.₅₀ | 8.4 | 20 | 3.0 | 70 | 9.8 | 0.80 | 0.53 | | | | |
| 18 | WO₂.₅₀ | 5.6 | 56 | 3.0 | 91 | 4.7 | 0.83 | Pol | | | | |
| 19 | WO₂.₅₀ | | 56 | 3.0 | 100 | 5.1 | Pol | Pol | | | | |
| 20 | WO₂.₀₀ | 34 | 3.4 | 3.0 | 9.1 | 7.6 | 0.81 | 0.68 | 0.85 | 0.79 | 0.81 | |
| 21 | WO₂.₀₀ | 28 | 28 | 3.0 | 50 | 5.1 | 0.80 | 0.62 | | 0.76 | 0.80 | 0.70 |
| 22 | W | 28 | 28 | 5.0 | 50 | 8.2 | 0.83 | 0.6 | 0.86 | 0.73 | | |
| 23 | MoO₂ᵇ | 34 | 3.4 | 3.0 | 9.1 | 7.6 | 0.84 | 0.62 | 0.87 | 0.78 | | |

Pol = Polarized.
ᵃ A transition from good to poor performance occured at −40 ma./cm.² (see Fig. 2).
ᵇ Prepared by H₂ reduction of MoO₃—X-ray diffraction shows the product to be about a ⅔–⅓ mixture (by weight) of MoO₂ and Mo₄O₁₁.

Results for various catalyst metal-tungsten oxide mixes using carbon monoxide as the fuel are presented in a somewhat different form in Table II. Here the current densities at a common overvoltage, with the ohmic (IR) drop eliminated, for the fuel electrode vs. a hydrogen reference electrode are tabulated for the several systems. In the last column of Table II the currents obtained with the various oxide additions are related to the current obtained without any addition. It is seen therefrom that with $WO_{2.0}$ present the current density at 0.2 volt versus the hydrogen reference electrode is 35 times greater than the current density obtained in its absence.

The weight percent of tungsten oxide in each electrode was 9.1 percent of the total weight of tungsten oxide and platinum. Also, the amount of binder (PTFE) employed in each electrode was 7.6 weight percent of the total electrode body material content. In the case of each fuel electrode a hydrophobic film was deposited containing 1.6 mg. of PTFE/cm.². The oxygen electrode (cathode) in each instance was a sintered PTFE platinum electrode structure having a platinum loading of 34 mg./cm.².

TABLE II.—COMPARISON OF CURRENT DENSITIES OBTAINED WITH CO ON SEVERAL METAL OXIDE-CATALYST COMBINATIONS AT THE SAME OVERVOLTAGE

[T=25° C.; Electrolyte: 5N H₂SO₄. Electrode Area =11.4 cm.²]

| Catalyst | Current density at fuel electrode potential of 0.2 v. vs. H₂ reference | |
|---|---|---|
| | $I_{(ma./cm.^2)}$ | $I_{(relative)}$ |
| Pt only | 2.6 | 1 |
| Pt+WO₃ | 3.5 | 1.3 |
| Pt+WO₂.₉₈ | 9.6 | 3.7 |
| Pt+WO₂.₆₉ | 29 | 11 |
| Pt+WO₂.₅ | 69 | 26 |
| Pt+WO₂.₀ | 92 | 35 |

In FIG. 2 are shown the representative polarization curves obtained with platinum black-tungsten oxide mixes using carbon monoxide as the fuel. Although the tungsten oxides are designated using various subscripts to indicate oxygen content, this is only for convenience of expression, since a variety of phases have been identified by X-ray diffraction in the tungsten oxide materials. Thus, Table III identifies more accurately the phases which have been identified in the oxide additives.

TABLE III.—METAL OXIDES USED WITH CATALYST IN FUEL CELL TESTS

| Oxide Additive | Phases Identified by X-ray Diffraction | Surface Area, m.²/gm. |
|---|---|---|
| CoMoO₄ (fired at 750° C.) | CoMoO₄+MoO₃ | |
| CoMoO₄ (fired at 1,000° C.) | CoMoO₄ | 2.2 |
| WO₃.₀₀ | WO₃ | 11.5 |
| WO₂.₉₈ | WO₃+W₂₀O₅₈ | 7–9 |
| WO₂.₉₀ | W₂₀O₅₈ | |
| WO₂.₆₉ | W₁₈O₄₉ | 1.9–2.2 |
| WO₂.₅₀ | W₁₈O₄₉+WO₂ | 1.5 |
| WO₂.₀₀ | WO₂ | 1.3 |

The cobalt molybdate additive was prepared from a mixture of 18.4 gm. (NH₄)₆Mo₇O₂₄·4H₂O and 12.4 gm. CoCO₃. After thorough mixing and grinding in a mortar, the mixture was heated overnight in a platinum crucible at 500° C. in a muffle furnace in air. After this treatment, the material was reground in the mortar before being returned to the furnace for about two hours during which time the furnace was heated to 750° C. (as noted in Table III). During this treatment a small amount of MoO₃ distilled from the molten mass. After removal from the furnace the molten mass solidified. As further cooling occurred the solid gradually disintegrated and small particles spalled from the cool top surface. Eventually, a fine grey powder was obtained through this mechanism. This phenomenon has been observed previously and has been attributed to a structural change at around 600° C.

The batch of cobalt molybdate product was divided and one portion was subsequently heated an additional two hours to 1000° C. (as noted in Table III). A small amount of additional MoO₃ distilled from the melt. Upon cooling the distintegration associated with the phase change again occurred and a second batch of grey cobalt molybdate powder was obtained.

The tungstic oxide, WO₃, was prepared by heating tungstic acid to 600° C. in a muffle furnace to eliminate water. The WO₂ as well as the non-stoichiometric oxides were all prepared by hydrogen reduction of the higher oxidation state.

In the case of all initial tests of the fuel electrodes using CO as the fuel in which protective oxide was incorporated, it was found necessary to activate the electrodes by pretreatment with hydrogen gas. A period of from about 5 to 15 minutes was found adequate. During this exposure current can be drawn from the electrode, but this is not necessary. The reason for the necessity of activation is not yet clear. However, extended operation (periods in excess of 18 hours on carbon monoxide) of fuel cells using fuel electrodes prepared in accordance with this invention properly activated has established that the superior performance of these electrodes does not result from the direct consumption of hydrogen stored by adsorption on the fuel eletcrode, nor from the creation of some reduced species, which subsequently serves as the "fuel." As long as fresh gaseous CO-rich fuel is continually supplied to such cells they continue to operate without any decline in performance. If, however, the supply of CO is interrupted as by replacing the CO with argon, the performance immediately falls with complete polarization occurring in less than a minute. The short delay before complete polarization results from consumption of the CO that is adsorbed on the catalyst. Retreatment with hydrogen re-establishes the initial performance.

FIG. 5 illustrates the capacity of fuel electrodes constructed in accordance with this invention to operate at relatively low polarizations and at a relatively low temperature over a very wide range of CO concentrations. The anode potential vs. a hydrogen reference electrode is plotted therein as a function of carbon monoxide content in the gas mixture. The platinum loading of the oxygen electrode (cathode) was 34 mg./cm.$^2$. A standard current density of 50 ma./cm.$^2$ was used and the gases were allowed to flow at a rate of about 10 cc./min. through the cell.

It is also of importance of note that it was found that at CO contents below 50 percent the electrodes could be strongly polarized by interrupting the fuel supply, and returned spontaneously to their normal operating potential as soon as fuel was again provided. This characteristic is shown by points $x$ and $y$ on FIG. 5. Point $x$ records the potential prior to fuel supply interruption and point $y$ shows the excellent recovery in potential after restoration of the fuel supply. At higher CO contents, however, it is necessary to reactivate the electrode by exposure to hydrogen before performance can be restored.

It is known that exposure to carbon monoxide deleteriously affects the hydrogen electrode potential wherein a noble metal catalyst is used even when the CO is present in only small amounts. A decided decrease in performance results from the strong tendency of carbon monoxide to absorb on the surface of the particles of catalyst metal. However, when oxide additive is employed in accordance with this invention, loss of potential at the anode (fuel electrode) is not great even when the carbon monoxide content is relatively high. In the absence of the oxide additive, the harmful effects are much greater both for pure carbon monoxide and for a representative reformer gas (containing CO) obtained from the steam reforming of methanol. This beneficial effect of the combination of the oxide and the catalyst metal in the fuel electrode is shown in Table IV below.

TABLE IV.—ANODE VS. REFERENCE POTENTIAL AT 50 MA./CM$^2$

| | Pure H$_2$, m.v. | Reformer gas,[1] | Pure CO, m.v. |
|---|---|---|---|
| 1. Pt Electrode | 10–20 | 310 | 420 |
| 2. Combined with 9.1% by weight WO$_2$ | 10–20 | 32 | 80 |

[1] A synthetic mixture containing 78% H$_2$, 2% CO, 20% CO$_2$ and 0.25% CH$_4$.

The electrode construction (see FIG. 1) employed PTFE for the inert bonding material to hold the electrode material in a unified mass and the electrolyte used was 5NH$_2$SO$_4$ at 85° C. The composition of electrodes 1 and 2 (Table IV) are the same as those of electrodes 1 and 20 (Table I), respectively.

Following these tests, a cell was placed in continuous operation on a 50 ma./cm.$^2$ load at 85° C. with a Pt—9.1% WO$_{2.5}$ fuel anode, whose composition was the same as that of electrode 11 (Table I). The synthetic reformer gas, whose composition is given above, was used as the fuel. Little change was evident in cell performance during a period of operation extending to as long as 75 hours as shown by polarization curves plotted after various periods of operation.

In addition to the aforementioned oxides, other oxides were tested and found unsuitable, because of their poor resistance to acidic solutions (particularly at higher temperature) and/or poor performance with carbon monoxide as the fuel.

The recitation of specific tungsten oxides herein in combination with platinum as the primary catalyst material does not preclude the preparation of fuel electrodes using tungsen metal mixed with platinum, after which the formation of tungsten oxides is effected in situ either before or during use of the electrode.

The beneficial contribution of the metal oxide additive found to result in the case of platinum failed to materialize when quantities of WO$_{2.50}$ were added to various other noble metals as the primary catalysts in the same general sintered PTFE electrode structure and composition ranges as were employed in the cases of platinum. In each case the electrolyte was 5NH$_2$SO$_4$ and the oxygen electrode was a sintered PTFE electrode with a catalyst loading of 34 mg./cm.$^2$.

In the case of rhodium the fuel electrodes employed sintered PTFE as the binder with 16.7 weight percent and 50 weight percent of the oxide in the metal oxide-rhodium mixture. The control fuel electrode was a sintered PTFE electrode having a rhodium loading of 45 mg. of Rh/cm.$^2$ and a concentration of 3.0 mg. of PTFE/cm.$^2$. All fuel electrodes were used in fuel cells operated both at 25° C. and at 85° C. with hydrogen, reformer gas and carbon monoxide as the various fuels.

With iridium as the primary catalyst the same percent compositions, binder and operating conditions were employed for the electrodes as with rhodium. For example, the control fuel electrode contained 45 mg. of Ir/cm.$^2$ and 3.0 mg. of PTFE/cm.$^2$. The palladium electrodes (sintered PTFE with 16.7 weight percent and 50 weight percent of the WO$_{2.5}$ as indicated) were operated only at 25° C. Both palladium electrode compositions were operated in fuel cells using hydrogen and reformer gas as fuels. The only palladium fuel electrode compositions, also used in a cell operated with carbon monoxide gas as the fuel, were the control electrode and that electrode having 16.7 weight percent WO$_{2.50}$ in the metal oxide-palladium. The control palladium fuel electrode contained 23 mg. of Pd/cm.$^2$ and 4.0 mg. of PTFE/cm.$^2$.

In the case of ruthenium (as with rhodium, iridium and palladium) it was found that whatever performance was obtained for electrodes wherein the noble metal was unaccompanied by the metal oxides of this invention remained relatively unaffected by the oxide addition. The ruthenium fuel electrodes used were the control electrode (45 mg. of Ru/cm.$^2$ and 3.0 mg. of PTFE/cm.$^2$) and one structure embodying WO$_{2.50}$ (16.7 weight percent of oxide). These fuel electrodes were operated both at 25° C. and at 85° C. with hydrogen, reformer gas and carbon monoxide as the various fuels.

The aforementioned observed lack of enhancement of the performance as catalysts of rhodium, iridium, ruthenium and palladium by the addition of specific oxides does not preclude the use of any of these metals as co-catalysts with platinum metal in an electrode body together with tungsten and/or molybdenum oxide.

In the aforementioned specification it has been clearly established that certain oxide materials, when employed together with platinum in the body of a fuel electrode results in an electrode structure capable of satisfactory operation in the presence of carbon monoxide, whether the carbon monoxide is present in large quantities as the prime component of a fuel, or in smaller quantities, such as an impurity in a reformed hydrocarbon. Thus, it appears that for the first time a solution has been found to the problem of platinum poisoning, whereby impure hydrogen from reformed hydrocarbons may now be successfully used in low temperature fuel cells.

What I claim as new and desire to secure by Letters Patent of the United States is:

1. In a fuel cell electrode structure for the electrochemical oxidation of a fuel containing carbon monoxide wherein the electrode body contains catalyst metal and binder material holding said electrode body together in a coherent, unitary, gas permeable, electronically conductive mass electrically connected to current collecting means, the improvement in which said electrode body is resistant to poisoning by carbon monoxide and comprises platinum and a carbon monoxide anti-poisoning adjuvant material selected from the group consisting of the oxides of molybdenum and the oxides of tungsten and mixtures thereof said adjuvant material being present in the proportion of at least 5 weight percent of the total amount of the platinum and adjuvant material present.

2. The fuel cell electrode structure improvement substantially as recited in claim 1 wherein the adjuvant material is at least one of the lower oxides of tungsten.

3. The fuel cell electrode structure improvement substantially as recited in claim 1 wherein the adjuvant material is $WO_{2.0}$.

4. The fuel cell electrode structure improvement substantially as recited in claim 1 wherein the adjuvant material is $MoO_2$.

5. The fuel cell electrode structure improvement substantially as recited in claim 1 wherein the adjuvant material is cobalt molybdate.

6. In a process of generating electrical energy utilizing a fuel containing carbon monoxide, the steps comprising
providing a first electrode structure having a platinum catalyst containing an anti-poisoning agent selected from the group consisting of the oxides of molybdenum and the oxides of tungsten and mixtures thereof,
providing a second electrode for the reduction of an oxidant,
ionically communicating the electrodes,
delivering the fuel containing carbon monoxide to the first electrode structure,
permitting the oxidant to contact the second electrode structure, and
drawing an electrical current from the electrode structures.

7. The process according to claim 6 in which reformer gas is delivered to the first electrode structure.

References Cited

UNITED STATES PATENTS

| | | | |
|---|---|---|---|
| 567,959 | 9/1896 | Borchers | 136—86 |
| 3,116,169 | 12/1963 | Thompson | 136—86 |
| 3,183,123 | 5/1965 | Haworth | 136—120 XR |

FOREIGN PATENTS 715,516  5/1931  France.

OTHER REFERENCES

Thorpe Dictionary of Applied Chemistry, vol. VIII, Longsmans, Green and Co., fourth ed., 1947; p. 218 relied on.

Catalysis, Inorganic and Organic, Berkman et al., Reinhold Publishing Corp., 1940 (pp. 44 and 295 relied on).

WINSTON A. DOUGLAS, *Primary Examiner.*

N. P. BULLOCH, *Assistant Examiner.*